United States Patent
Sakabe

(10) Patent No.: US 9,369,257 B2
(45) Date of Patent: Jun. 14, 2016

(54) BASE STATION, MOBILE STATION, CONTROL METHOD, AND COMMUNICATION SYSTEM

(71) Applicant: FUJITSU LIMITED, Kawasaki-shi, Kanagawa (JP)

(72) Inventor: Tetsuta Sakabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 300 days.

(21) Appl. No.: 14/022,816

(22) Filed: Sep. 10, 2013

(65) Prior Publication Data

US 2014/0010105 A1    Jan. 9, 2014

Related U.S. Application Data

(63) Continuation of application No. PCT/JP2011/056661, filed on Mar. 18, 2011.

(51) Int. Cl.
*H04L 5/00* (2006.01)
*H04W 72/08* (2009.01)

(52) U.S. Cl.
CPC ............ *H04L 5/006* (2013.01); *H04W 72/08* (2013.01)

(58) Field of Classification Search
None
See application file for complete search history.

(56) References Cited

U.S. PATENT DOCUMENTS

| | | | |
|---|---|---|---|
| 2006/0120321 A1* | 6/2006 | Gerkis et al. | 370/329 |
| 2009/0245225 A1 | 10/2009 | Tseng | |
| 2009/0268707 A1* | 10/2009 | Pani et al. | 370/345 |
| 2009/0290559 A1* | 11/2009 | Pelletier et al. | 370/336 |
| 2010/0042888 A1* | 2/2010 | Kuo | 714/749 |
| 2010/0192035 A1 | 7/2010 | Sagfors et al. | |

FOREIGN PATENT DOCUMENTS

| | | |
|---|---|---|
| EP | 1811799 A1 | 7/2007 |
| EP | 2034757 A1 | 3/2009 |
| EP | 2107709 A2 | 10/2009 |
| EP | 2184883 A2 | 5/2010 |
| JP | 2009-253981 | 10/2009 |
| JP | 2010-45790 | 2/2010 |

(Continued)

OTHER PUBLICATIONS

International search report issued for corresponding International Patent Application No. PCT/JP2011/056661, mailed May 24, 2011.

(Continued)

*Primary Examiner* — Hassan Phillips
*Assistant Examiner* — Gautam Sharma
(74) *Attorney, Agent, or Firm* — Myers Wolin, LLC

(57) ABSTRACT

A base station communicates with a mobile station consecutively transmitting a predetermined number of data for each predetermined time interval. The base station includes a measuring unit that using a predetermined threshold value, determines reception quality of the predetermined number of data that are consecutive and received from the mobile station; and a control unit that in response to a result of the measurement by the measuring unit, executes control to output any one among first notification information to cause the mobile station to transmit the same data, for the predetermined time interval and second notification information to cause the mobile station to transmit plural data that are different from one another, for the predetermined time interval.

11 Claims, 14 Drawing Sheets

(56) References Cited

FOREIGN PATENT DOCUMENTS

| | | |
|---|---|---|
| JP | 2010-530709 | 9/2010 |
| WO | 2008/156414 A2 | 12/2008 |

OTHER PUBLICATIONS

International Preliminary Report on Patentability corresponding to International Patent Application No. PCT/JP2011/056661, issued Oct. 3, 2013 with English translation.

Susitaival et al., "LTE coverage improvement by TTI bundling", IEEE Copyright 2009.

Extended European Search Report with Supplementary European Search Report and the European Search Opinion issued for corresponding European Patent Application No. 11861543.4 dated Dec. 17, 2014.

* cited by examiner

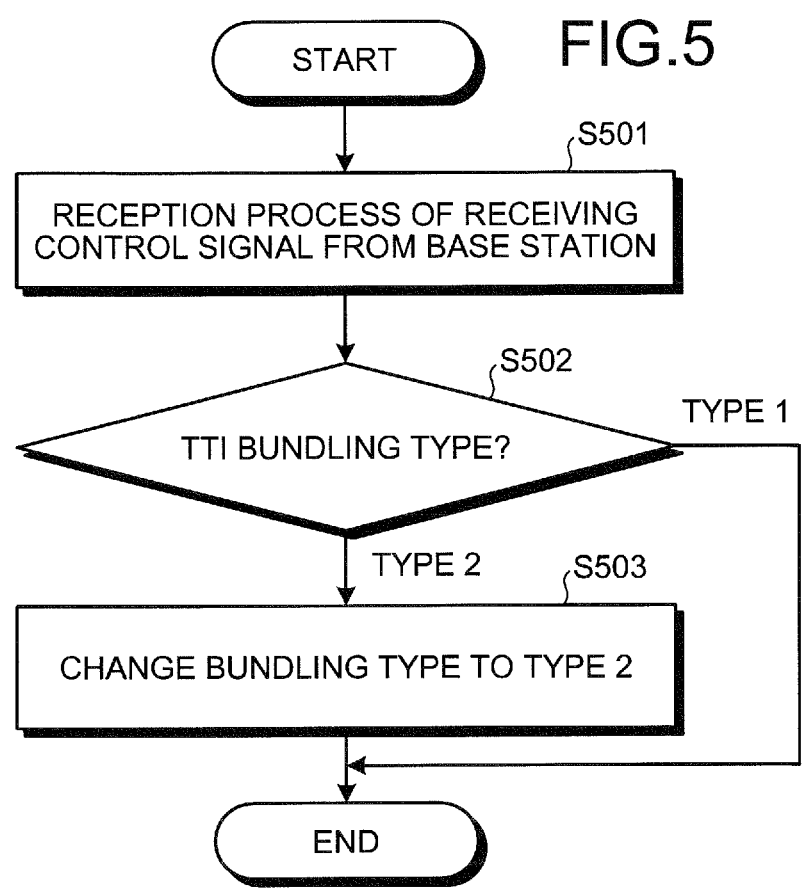

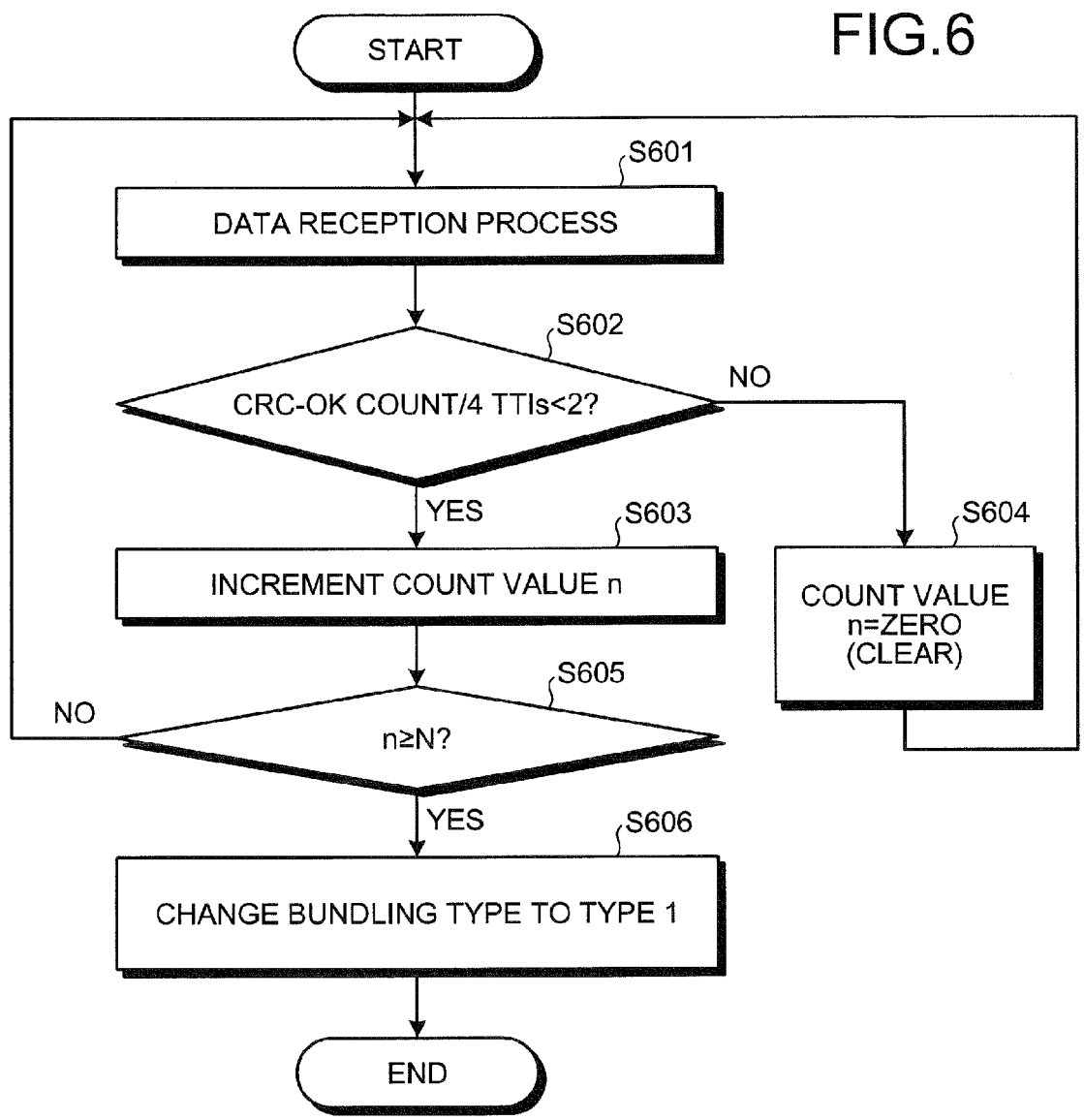

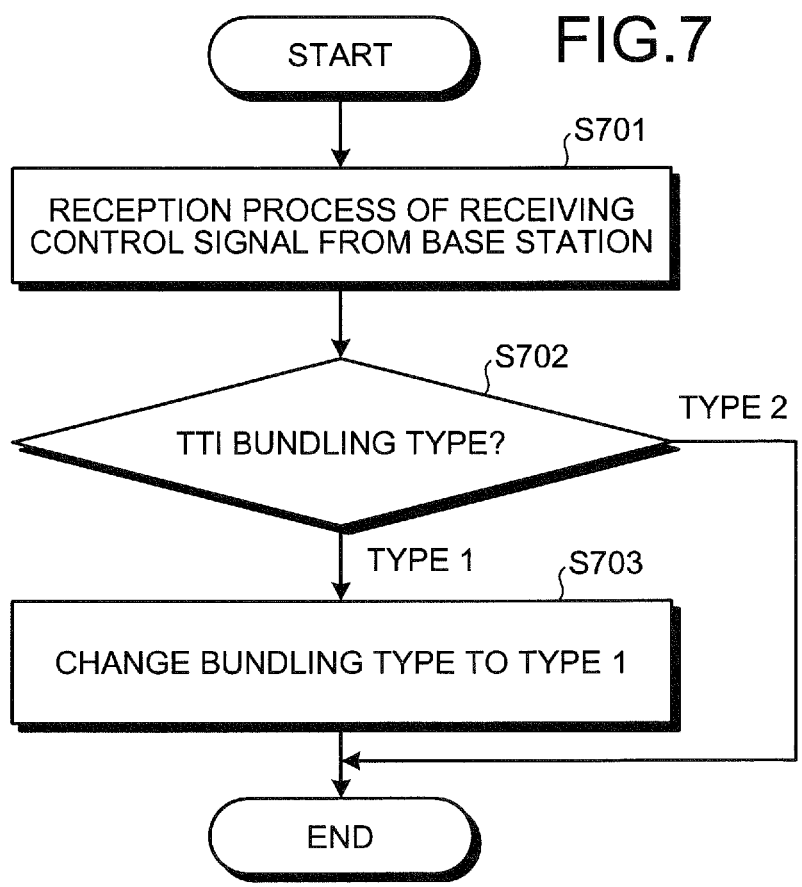

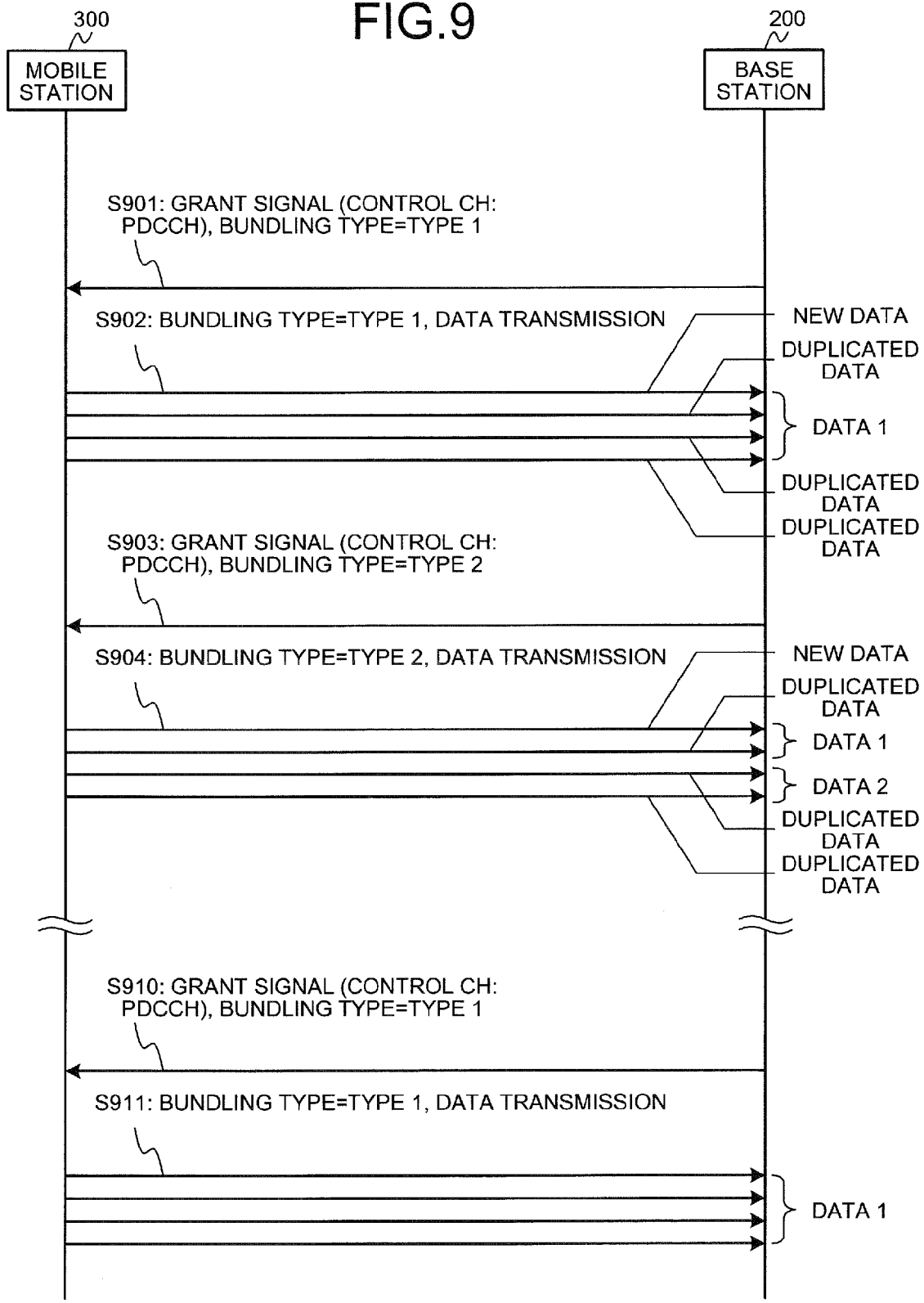

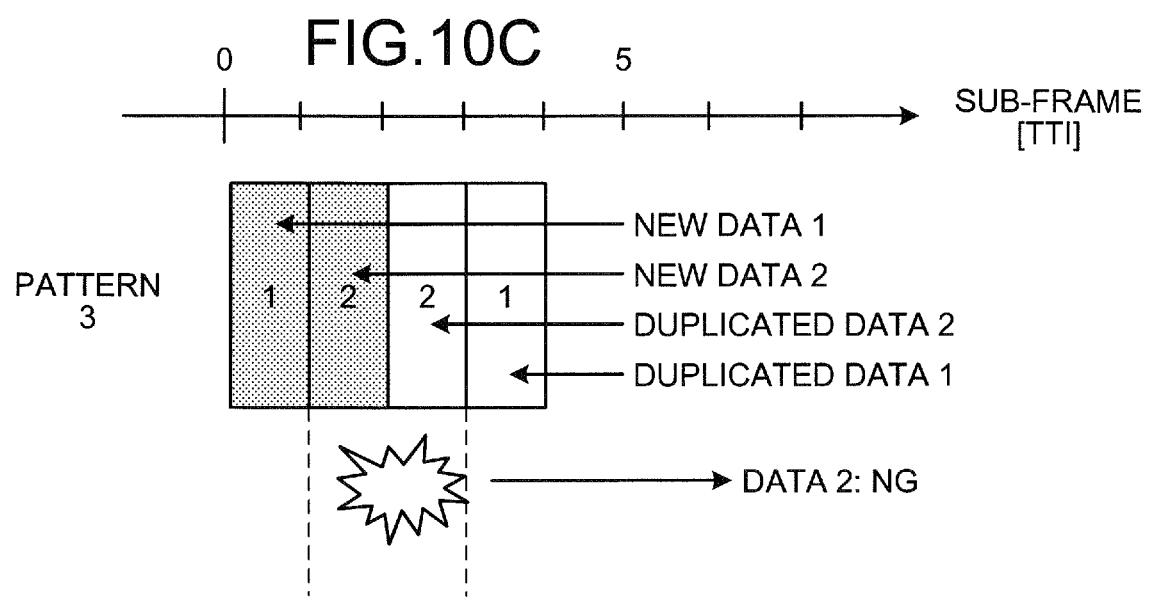

BASE STATION, MOBILE STATION, CONTROL METHOD, AND COMMUNICATION SYSTEM

CROSS REFERENCE TO RELATED APPLICATIONS

This application is a continuation application of International Application PCT/JP2011/056661, filed on Mar. 18, 2011 and designating the U.S., the entire contents of which are incorporated herein by reference.

FIELD

The embodiments discussed herein are related to a base station, a mobile station, a control method, and a communication system.

BACKGROUND

In the long term evolution (LTE), to realize a further increase of the data rate, a short transmission time interval (TTI) such as, for example, 1 [ms] is employed. Reduction of the TTI reduces a round trip time (RTT) necessary for controlling retransmission and, thereby, any delay in a system is reduced.

On the other hand, in a system employing the short TTI, for example, for a mobile station (user equipment: UE) located on an edge of a cell, sufficient energy cannot be secured for transmission because the transmission electric power is limited. In this case, a state occurs where a base station cannot accurately receive data from the mobile station due to the radio wave quality. In this case, it is important how significantly the delay caused by the data retransmission is reduced.

A technique is disclosed as a retransmission method for data in the LTE system, according to which data including an error and retransmitted data are coupled, thereby, a correction capacity is improved, and the retransmission frequency is suppressed, based on hybrid automatic repeat request (HARQ) control (see, e.g., Published Japanese-Translation of PCT Application, Publication No. 2010-530709).

However, according to the HARQ control, a delay corresponding to eight TTIs [s] is generated judging from the transmission time interval (TTI) from the time when the data is transmitted through the time when a receiving apparatus receives the data to the time of a response thereto (an ACK or NACK response). When the retransmission is repeated for n times, a delay corresponding to n×RTT (eight TTIs) is generated and this becomes an obstacle against realization of a high data transmission speed.

In the LTE, a retransmission procedure using TTI bundling is employed as an approach against the delay (see, e.g., Japanese Laid-Open Patent Publication No. 2009-253981). The "TTI bundling" is an approach to facilitate improvement of the reception quality by consecutively transmitting packets each including same data for several TTIs and coupling the data with each other in the reception side.

The "TTI bundling" is a method of improving the reception quality without executing any retransmission procedure in response to a reception response by transmitting the same data consecutively for several TTIs from the first one and coupling the data received for several TTIs in the reception side. Under the 3GPP, it is defined that a TTI bundle size=4; in the first transmission session, new data×1 and retransmission data×3 (that is, basically, four data whose contents are the same as that of the new data) are consecutively transmitted in four TTIs without waiting for any reception response; and the reception side can receive one normal data acquired by coupling the data for four TTIs consecutively received at the reception side. When the retransmission frequency is high, improvement of the data transmission efficiency and realization of reduced delays are enabled by switching the scheme from a non-bundling HARQ scheme to the TTI bundling scheme.

However, according to the conventional techniques, a problem arises in that the communication efficiency cannot be sufficiently improved.

According to the existing TTI bundling, only one data can be transmitted in four TTIs. The TTI bundling operates when the radio wave state is not so favorable, and is effective. However, the redundant resources are useless in contrast when the radio wave state is gradually improved and among the four TTIs, for example, for two TTIs that is a half thereof or more, the reception quality (for example, acquired by a cyclic redundancy check (CRC)) becomes high for the data thereof. In this case, the switching of the scheme from the TTI bundling scheme to the HARQ scheme may be considered. However, the transmission efficiency does not vary with either one of the TTI bundling scheme and the non-bundling scheme although the CRC is improved for only two TTIs.

In addition, to switch the scheme from the TTI bundling scheme to the non-bundling HARQ scheme, resource reallocation, etc., are necessary based on an RACH sequence (mutual communication between the base station and the mobile station triggered by an RRC connection reconfiguration from the base station to the mobile station). Therefore, the communication between the base station and the mobile station is increased and more time is necessary. Consequently, when the TTI bundling scheme is used, provision of a control method is effective that enables the transmission efficiency to be variable depending on the radio wave state, maintaining the use of the TTI bundling scheme.

SUMMARY

According to an aspect of an embodiment, a base station communicates with a mobile station consecutively transmitting a predetermined number of data for each predetermined time interval. The base station includes a measuring unit that using a predetermined threshold value, determines reception quality of the predetermined number of data that are consecutive and received from the mobile station; and a control unit that in response to a result of the measurement by the measuring unit, executes control to output any one among first notification information to cause the mobile station to transmit the same data, for the predetermined time interval and second notification information to cause the mobile station to transmit plural data that are different from one another, for the predetermined time interval.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart of a bundling type change process executed by the mobile station when the reception quality improves;

FIG. 6 is a flowchart of a bundling type change process executed when the reception quality at the base station drops;

FIG. 7 is a flowchart of a bundling type change process executed by the mobile station when the reception quality drops;

FIG. 9 is a sequence diagram of communication on a bundling type change between the base station and the mobile station;

FIGS. 10A, 10B, and 10C are each a diagram of data resource allocation when the bundling type is a type 2;

DESCRIPTION OF EMBODIMENTS

Preferred embodiments will be described in detail with reference to the accompanying drawings.

Figure 1:
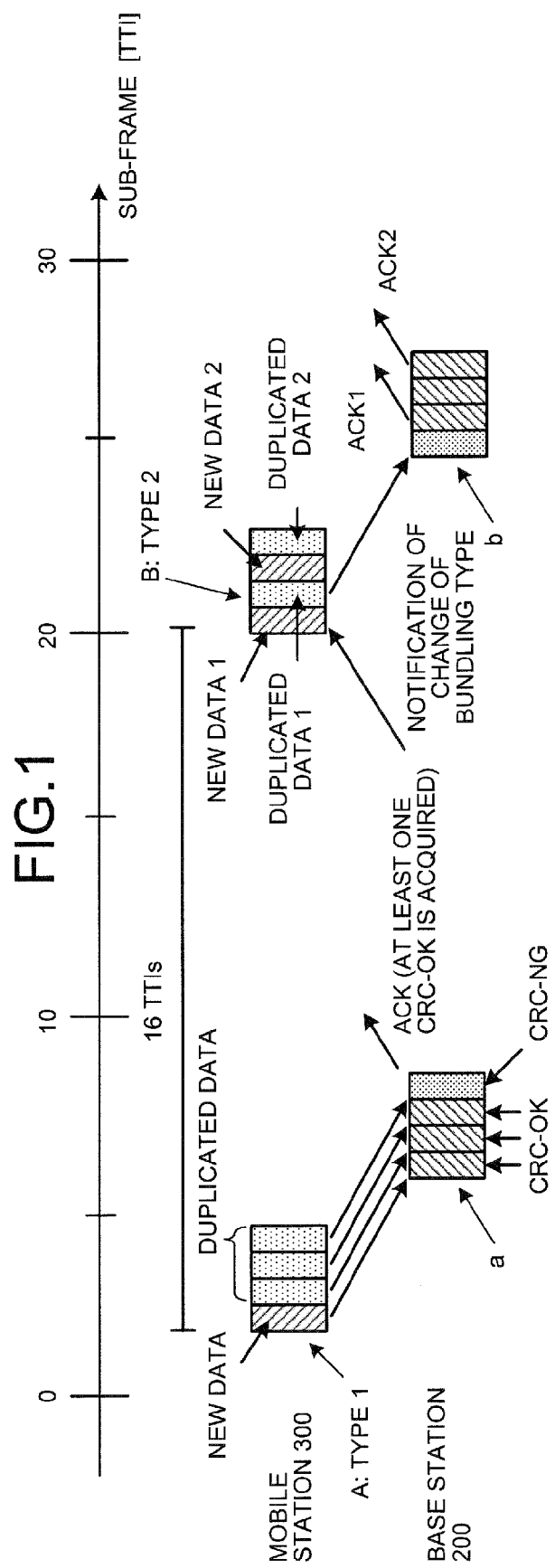
FIG. 1 is a schematic diagram of a communication method according an embodiment.

FIG. 1 is a schematic diagram of a communication method according the embodiment. An overview of the communication method according to the embodiment will be described. A base station monitors the reception state of data based on TTI bundling transmitted from a mobile station such as a mobile terminal. The mobile station executes the TTI bundling to consecutively transmit the same packets for TTI (transmission time interval) bundles of a predetermined number to the base station in one transmission session. In this case, according to the standard, initially, the data transmission for one session (corresponding to four TTIs) is executed using four packets. The packet for one TTI is transmitted and used for new data and the packets for the remaining three TTIs are transmitted and used for data duplicated from the new data (data A of FIG. 1).

The base station monitors the reception quality for data "a" acquired after the reception of the data A transmitted from the mobile station. When the reception quality of at least one among the new data and the duplicated data is favorable (for example, CRC-OK: no error), the base station sends back an ACK to the mobile station that indicates that the data can be received normally. It is assumed that the base station can determine that the probability of being able to receive the data is high when one combination of the data is present that includes the data for the two TTIs (the new data×1 and the duplicated data×1). For example, for the data a depicted in FIG. 1, the base station can determine that the probability of the reception quality being favorable (CRC-OK) is ¾ and therefore, determines that the data can be received favorably even using the new data×1 and the duplicated data×1.

In this case, the base station notifies the mobile station to change the transmission type not to use the four TTIs for one data transmission session but to transmit two different data (new data 1+duplicated data 1 of the new data 1)+(new data 2 different from the new data 1+duplicated data 2 of the new data 2), that is, two different combinations of data (respectively for two data) during one session (the four TTIs).

When the mobile station receives the notification of the change of the transmission type from the base station, the mobile station transmits to the base station, the two different combinations of data such as (the new data 1+the duplicated data 1)+(the new data 2+the duplicated data 2) during the four TTIs as data B depicted in FIG. 1.

As depicted in FIG. 1, a type of allocation in which one data is allocated to each of four TTIs (the data A) as a conventional type will be referred to as "type 1". A type of allocation in which two data are allocated to two TTIs+two TTIs (the data B) as described above will be referred to as "type 2". Notification information of the change of the bundling type, from the base station to the mobile station is included in a control CH (PDCCH) of a downlink control signal from the base station to the mobile station.

In the type 2, determination on an ACK or an NACK for the data received by the base station is made for the two data, respectively (data b). When the reception quality is favorable for either the new data or the duplicated data of one data combination of the two TTIs, the data can be decoded normally and therefore, an ACK 1 can be send back for this data combination and an ACK 2 is determined for the other combination.

In this manner, the base station monitors the data reception quality of the TTI bundling transmitted from the mobile station and executes resource control of the data to be transmitted to the base station, for the mobile station. Thereby, in the type 2, for the uplink from the mobile station to the base station, the probability of reception by the base station is increased in a state where the TTI bundling operation is maintained, that is, where the combinations including the new data and the duplicated data in each one combination are maintained and, concurrently, transmission of about two times more data is enabled. Therefore, efficient data transmission is enabled.

Figure 2:
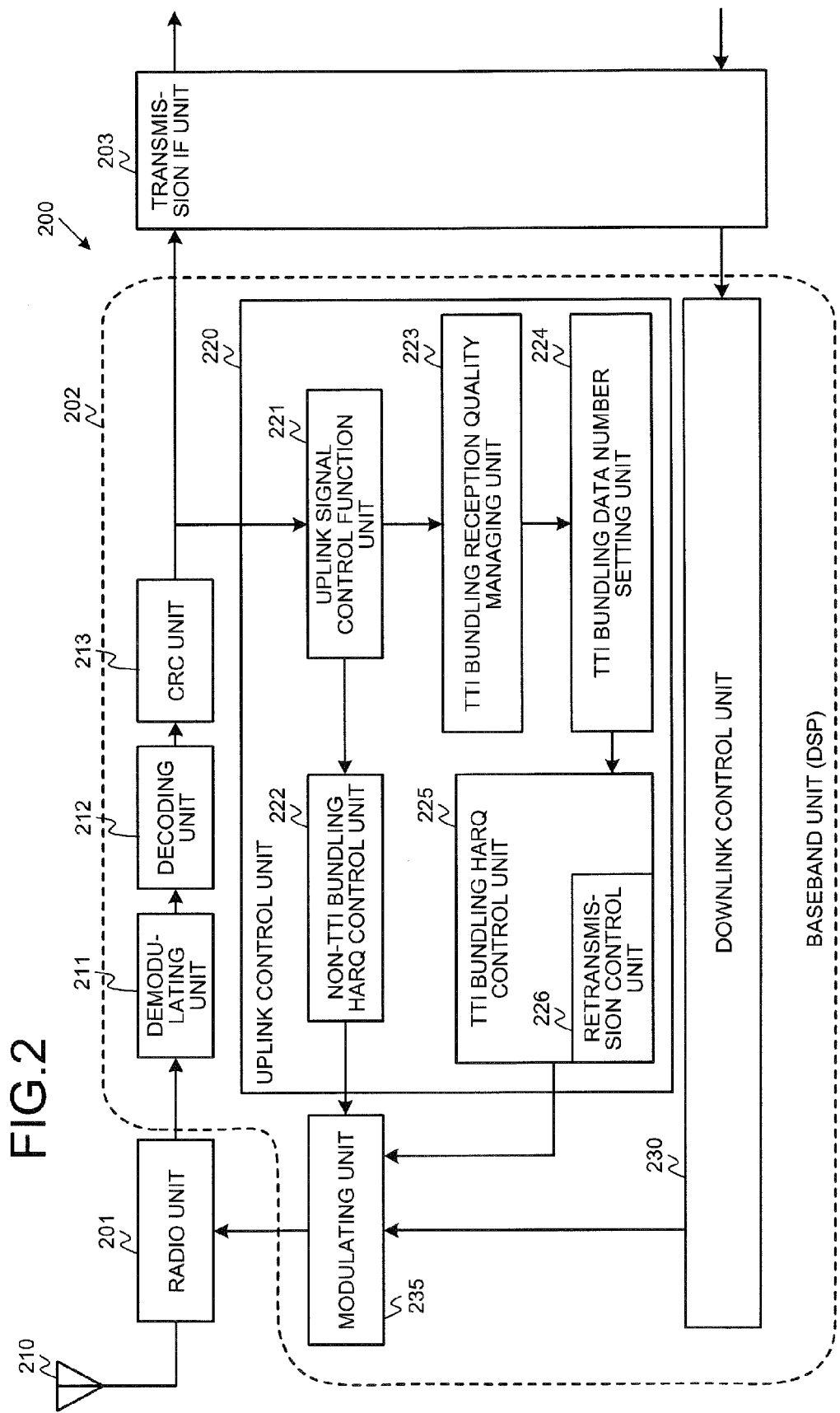
FIG. 2 is a block diagram of an example of a configuration of a base station according to the embodiment.

FIG. 2 is a block diagram of an example of a configuration of the base station according to the embodiment. The base station 200 includes a radio unit 201, a baseband unit 202, and a transmission IF unit 203. The radio unit 201 transmits and receives RF radio waves through an antenna 210. A signal of the received radio wave is demodulated by a demodulating unit 211 of the baseband unit 202 and is decoded by a decoding unit 212. For the signal decoded by the decoding unit 212, a CRC unit 213 executes a CRC check as a measuring unit to measure and manage the reception quality of the data. The baseband unit 202 can be realized by, for example, a digital signal processor (DSP).

The signal received through the CRC unit 213 is externally output through the transmission IF unit 203. The CRC unit 213 executes a CRC (error detection) for each packet (data) output from the decoding unit 212. The CRC unit 213 outputs to the transmission I/F unit 203, the packet for which the CRC unit 213 executes the CRC and CRC information that indicates a CRC result. The CRC information is information concerning the result of the error detection executed for each packet and is information indicating, for example, whether the packet includes any error (CRC-OK or CRC-NG). The result of the CRC check executed by the CRC unit 213 is output to an uplink control unit 220.

Describing the transmission of data to the mobile station, data is input into the transmission IF unit 203 and the data is modulated by a modulating unit 235 through a downlink control unit 230; is output to the radio unit 201; and is transmitted from the antenna 210 to the mobile station.

The uplink control unit 220 transmits a control signal concerning a change of the number of bundles for the mobile station, etc. Describing the interior of the uplink control unit 220, the interior includes an uplink signal control function unit 221, a non-TTI bundling HARQ control unit 222, a TTI bundling reception quality managing unit 223, a TTI bundling data number setting unit 224, and a TTI bundling HARQ control unit 225. The TTI bundling HARQ control unit 225 includes a retransmission control unit 226 that controls retransmission of bundled data.

The uplink signal control function unit 221 executes control on an uplink signal and determines whether the TTI bundling is caused to function, depending on the state of the radio wave intensity. The uplink signal control function unit 221 also relays the CRC result (CRC-OK or CRC-NG) acquired by the CRC unit 213, for each resource received from the mobile station. When the uplink signal control function unit 221 causes the TTI bundling to function (TTI bundling=ON), the TTI bundling reception quality managing unit 223 and the units thereafter execute the control for the TTI bundling transmission. On the other hand, when not the TTI bundling but a normal retransmission control is caused to function (TTI bundling=OFF), the uplink signal control function unit 221 causes the retransmission control executed by the non-TTI bundling HARQ control unit 222 to be executed.

In this embodiment, the transmission control is mainly described that is based on the functioning TTI bundling (TTI bundling=ON). However, a case where retransmission control by the non-TTI bundling HARQ control unit 222 is caused to function (TTI bundling=OFF) or where the TTI bundling is caused to function (TTI bundling=ON) is selected, and the corresponding information is included in the control signal and is transmitted to the mobile station. The selection of the scheme from the non-TTI bundling HARQ scheme and the TTI bundling scheme will be described using the state transition described later.

The TTI bundling reception quality managing unit 223 receives the CRC result from the CRC unit 213 through the uplink signal control function unit 221 and determines the bundling type (the type 1 or the type 2) based on the reception quality. As the result of the reception of the data A of FIG. 1 from the mobile station, when an favorable reception quality (CRC-OK) is acquired in one transmission session (four TTIs) (the data a of FIG. 1), the TTI bundling reception quality managing unit 223 causes the bundling type to be changed from the type 1 employed so far to the type 2 (the data B of FIG. 1). As described later, when the reception quality is degraded, the TTI bundling reception quality managing unit 223 causes the bundling type to be changed from the type 2 to the type 1.

The TTI bundling data number setting unit 224 sets the number of data and the data arrangement pattern (the arrangement of the new data and the duplicated data) for one transmission session (four TTIs) corresponding to the bundling type changed by the TTI bundling reception quality managing unit 223. For the type 1, the TTI bundling data number setting unit 224 makes a setting to dispose the packet for one TTI for the new data and the packets for the remaining three TTIs for the duplicated data of the new data. For the type 2, the TTI bundling data number setting unit 224 makes a setting of the arrangement to transmit two data that are different from each other (the new data 1+the duplicated data 1 of the new data 1)+(the new data 2 different from the new data 1+the duplicated data 2 of the new data 2), that is, two combinations different from each other (for two data) during the one transmission session (four TTIs).

The TTI bundling HARQ control unit 225 executes the actual resource allocation and outputs the control signal. The TTI bundling HARQ control unit 225 includes the retransmission control unit 226 and controls the duplication of data and the retransmission of data by the mobile station. The modulating unit 235 modulates the control signal output from the TTI bundling HARQ control unit 225, based on a predetermined modulation scheme. The radio unit 201 transmits the modulated control signal to the mobile station through the antenna 210.

Figure 3:
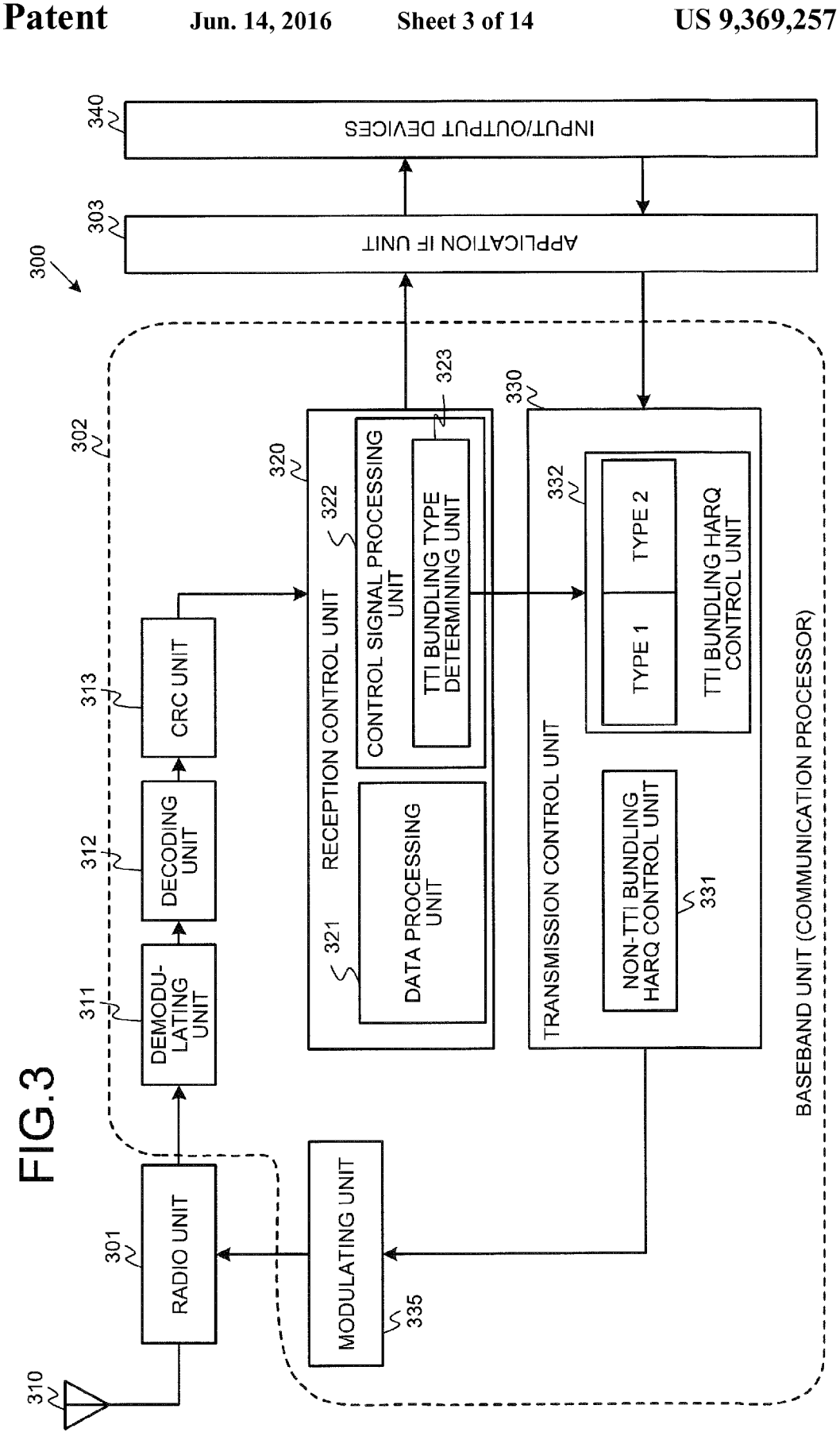
FIG. 3 is a block diagram of an example of a configuration of a mobile station according to the embodiment.

FIG. 3 is a block diagram of an example of a configuration of the mobile station according to the embodiment. The mobile station 300 includes a radio unit 301, a baseband unit 302, and an application IF unit 303. The mobile station 300 is, for example, a mobile telephone terminal.

The base band unit 302 includes a demodulating unit 311, a decoding unit 312, a CRC unit 313, a reception control unit 320, a transmission control unit 330, and a modulating unit 335. The baseband unit 302 can be realized by, for example, a communication processor included in the mobile telephone terminal.

The radio unit 301 transmits and receives an RF radio wave through an antenna 310. A signal of the received radio wave is demodulated by a demodulating unit 311 of the baseband unit 302 and is decoded by a decoding unit 312. The CRC unit 313 executes a CRC check for the signal decoded by the decoding unit 312 and the decoded signal is output to the reception control unit 320.

The reception control unit 320 includes a data processing unit 321 and a control signal processing unit 322. The data processing unit 321 processes the received data and outputs the processed data to input/output devices through the application IF unit 303. The received control signal is processed by the control signal processing unit 322 and the bundling type thereof is determined by a TTI bundling type determining unit 323. The control signal includes information to select the non-TTI bundling function or information to select the TTI bundling function and the TTI bundling type, and this information is output to the transmission control unit 330.

Describing the transmission of data to the base station 200, the data is input into the application IF unit 303 from input/output devices 340, is modulated by the modulating unit 335 through the transmission control unit 330, is input into the radio unit 301, and is transmitted from the antenna 310 to the base station 200. The data to be transmitted to the base station 200 is controlled for retransmission and transmitted by the transmission control unit 330.

The transmission control unit 330 includes a non-TTI bundling HARQ control unit 331 and a TTI bundling HARQ control unit 332. When the signal for the transmission control output from the control signal processing unit 322 is for the non-TTI bundling HARQ control, the transmission control unit 330 causes the non-TTI bundling HARQ control unit 331 to function and transmits the data to the mobile station 300 having the normal retransmission function by the non-TTI bundling HARQ control unit 331. On the other hand, when the signal is for the TTI bundling, the transmission control unit 330 causes the TTI bundling HARQ control unit 332 to function and transmits the data having the TTI bundling function. The non-TTI bundling HARQ control will not be described.

The TTI bundling HARQ control unit 332 changes the TTI bundling type (the type 1 or the type 2) in response to the signal (the bundling type) output from the control signal processing unit 322, and outputs the data in the changed type.

The modulating unit 335 modulates the data output from the transmission control unit 330 based on the predetermined modulation scheme. The radio unit 301 transmits the modulated data to the base station 200 through the antenna 310.

Figure 4:
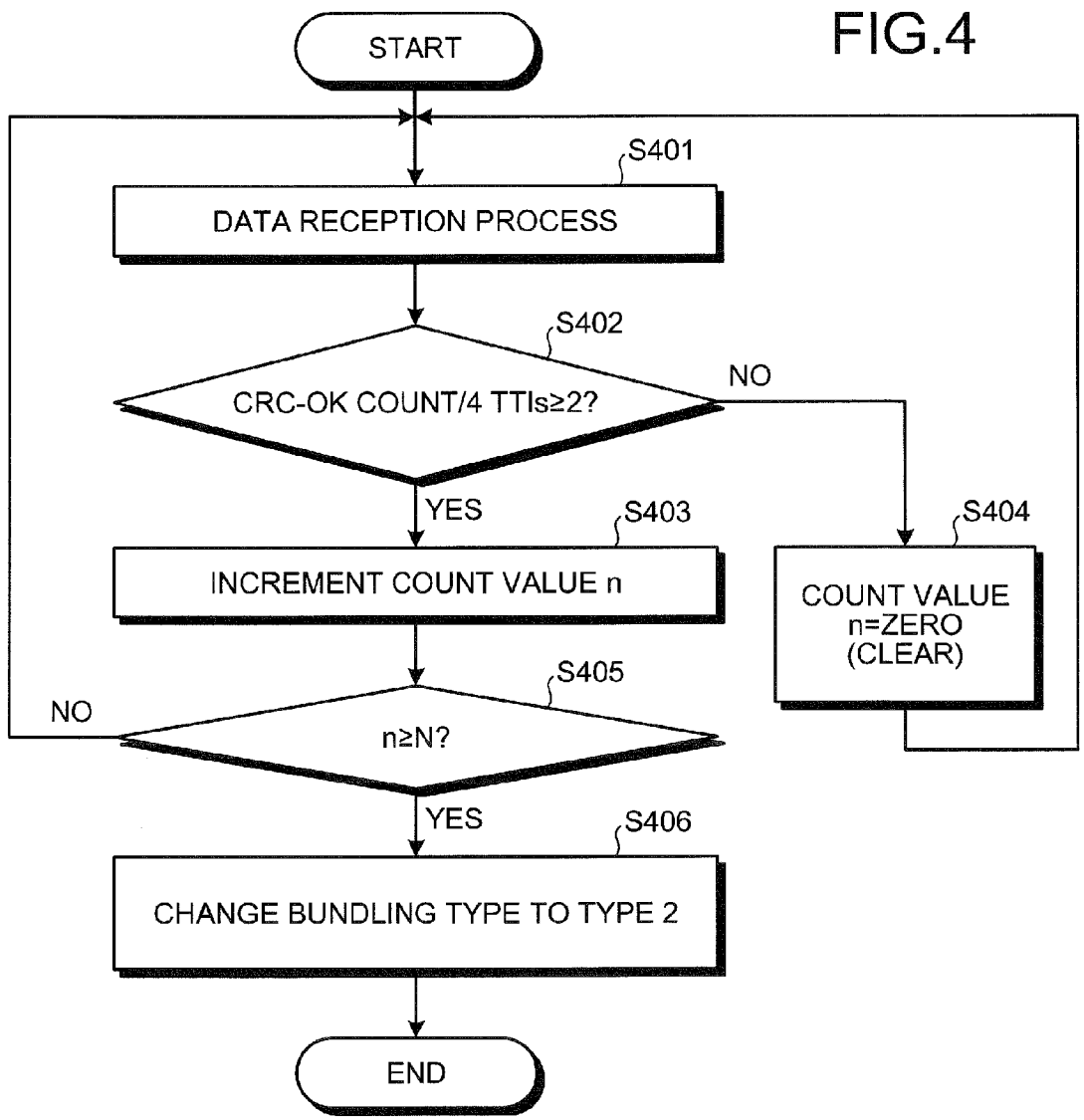
FIG. 4 is a flowchart of a bundling type change process executed by the base station when reception quality improves.

FIG. 4 is a flowchart of a bundling type change process executed by the base station when the reception quality improves. FIG. 4 depicts the process executed when the radio wave state of the radio wave transmitted from the mobile station 300 becomes favorable (is improved) and the data reception quality has improved. It is assumed that the bundling type at the start of the process is the type 1.

When the data reception quality becomes favorable, the TTI bundling type is changed to the type 2 to improve the throughput of the uplink. When the reception quality does not become favorable or stable, the bundling type is maintained to be the type 1.

The base station 200 receives the radio wave from the mobile station 300 via the radio unit 201 (step S401). The reception quality (CRC) of the decoded data is detected by the CRC unit 213. The TTI bundling reception quality managing unit 223 compares the number of CRC-OKs for each one transmission session (four TTIs) with a threshold value (the value=2) determined in advance (step S402). Under the current standard of the 3GPP, the bundle size is four and therefore, preferably, the value of the threshold value=2 to produce one data combination (of the new data and the duplicated data) for two TTIs.

If the number of CRC-OKs is greater than or equal to the threshold value (step S402: YES), the count value n is incremented by one (step S403). On the other hand, if the number of CRC-OKs is less than the threshold value (step S402: NO), the count value n acquired so far is cleared to zero (step S404) and the procedure returns to step S401.

After executing the process at S403, the TTI bundling reception quality managing unit 223 determines whether the count value n exceeds a change threshold value N preliminarily determined for determining the bundling type switching (step S405). The change threshold value N is set to be greater than or equal to one (corresponding to the change threshold value N that is N=1 in the example of FIG. 1). If the change threshold value N is set to be two, the determination is made based on the reception quality for the two sessions. Thereby, when the condition checked at step S402 is satisfied for consecutive plural transmission sessions (by the reception states thereof), the value of the count value n is increased. During the time while the count value n has not reached the change threshold value N (step S405: NO), the processes executed at step S401 and thereafter are similarly executed for the next transmission session (four TTIs).

When the TTI count value n exceeds the change threshold value N (step S405: YES), the TTI bundling reception quality managing unit 223 changes the bundling type from the type 1 to the type 2 (step S406) and causes the change process to come to an end. For example, the TTI bundling reception quality managing unit 223 controls the TTI bundling HARQ control unit 225 via the TTI bundling data number setting unit 224, to change the bundling type to the type 2. This control is transmitted to the mobile station 300 as a control signal and, in practice, the mobile station 300 changes the bundling type from the type 1 to the type 2.

In the process, when the change threshold value N to be compared at step S405 is exceeded, the bundling type is change to the type 2 after the reception quality becomes stable.

FIG. 5 is a flowchart of a bundling type change process executed by the mobile station when the reception quality improves. The mobile station 300 changes the bundling type based on the control signal transmitted from the base station 200. The expression "the reception quality improves" means that the reception quality of data received by the base station 200 from the mobile station 300 has improved. The mobile station 300 receives the control signal including the information concerning the bundling type change and changes the bundling type. It is assumed that the bundling type at the start of the process is the type 1.

The mobile station 300 receives the radio wave transmitted from the base station 200 using the radio unit 301, executes the reception process to decode the control signal via the decoding unit 312 (step S501), and determines the information concerning the bundling type included in the control signal via the control signal processing unit 322 (step S502). If the bundling type is the type 1 (step S502: TYPE 1), the mobile station 300 causes the process to come to an end without executing any change of the bundling type.

On the other hand, if the bundling type is the type 2 (step S502: TYPE 2), the TTI bundling HARQ control unit 332 changes the bundling type from the type 1 to the type 2 (step S503) and causes the change process to come to an end. Thus, thereafter, the bundling type of data transmitted from the mobile station 300 to the base station 200 is the bundling type represented by the type 2 (the data B of FIG. 1).

FIG. 6 is a flowchart of a bundling type change process executed when the reception quality at the base station drops. FIG. 6 depicts a process that is executed after the bundling type is changed to the type 2 by the process depicted in FIG. 4 and that is executed when the radio wave state of the radio wave transmitted from the mobile station 300 drops (weakens) and the data reception quality drops.

When the reception quality of data drops, the TTI bundling type is changed to the type 1 to decrease the throughput of the uplink. When the reception quality is favorable and stable, the type 2 is maintained.

The base station 200 receives a radio wave transmitted from the mobile station 300, via the radio unit 201 (step S601). The CRC unit 213 detects the reception quality (CRC) of the decoded data. The TTI bundling reception quality managing unit 223 compares the number of CRC-OKs for each transmission session (four TTIs) with a threshold value (the value=2) that is determined in advance (step S602). If the number of CRC-OKs is less than the threshold value (step S602: YES), the TTI bundling reception quality managing unit 223 increments the count value n by one (step S603). On the other hand, if the number of CRC-OKs is not less than the threshold value (step S602: NO), the TTI bundling reception quality managing unit 223 clears the count value n to zero (step S604) and returns to the process at step S601.

After executing the process at step S603, the TTI bundling reception quality managing unit 223 determines whether the TTI count value n exceeds the change threshold value N preliminarily determined for the bundling type switching determination (step S605). The change threshold value N is set to be greater than or equal to one. Thereby, when the condition checked at step S602 is satisfied for consecutive plural transmission sessions, the value of the count value n is increased. During time while the count value n has not reached the change threshold value N (step S605: NO), the processes executed at step S601 and thereafter are similarly executed for the next transmission session (four TTIs).

When the TTI bundling reception quality managing unit 223 determines that the TTI count value n exceeds the change threshold value N (step S605: YES), the TTI bundling reception quality managing unit 223 changes the bundling type from the type 2 to the type 1 (step S606) and causes the change process to come to an end. For example, the TTI bundling reception quality managing unit 223 controls the TTI bundling HARQ control unit 225 via the TTI bundling data number setting unit 224, to change the bundling type to the type 1. This control is transmitted to the mobile station 300 as a control signal and, in practice, the mobile station 300 changes the bundling type from the type 1 to the type 2.

In a case where the radio wave state has dropped, when the bundling type is maintained to be the type 2, retransmission occurs. Judging from presence or absence of the occurrence of the data retransmission, the occurrence of the retransmission can be suppressed for the type 1 in which four of the same data are included in each transmission session, compared with the type 2 in which plural data each different from one another are included therein. Therefore, for example, the value of the change threshold value N is reduced when the stability of the reception quality is determined in a short time and the bundling type is switched early to the type 1, which suppress the occurrence of retransmission.

FIG. 7 is a flowchart of a bundling type change process executed by the mobile station when the reception quality drops. The mobile station 300 changes the bundling type based on the control signal transmitted from the base station 200. The mobile station 300 receives the control signal including information concerning the change of the bundling type and changes the bundling type. It is assumed based on the process of FIG. 5 that the bundling type at the start of the process is the type 2.

The mobile station 300 receives a radio wave transmitted from the base station 200 using the radio unit 301, executes a reception process to decode the control signal using the decoding unit 312 (step S701), and determines the information concerning the bundling type included in the control signal using the control signal processing unit 322 (step S702). If the bundling type is the type 2 (step S702: TYPE 2), the mobile station 300 causes the process to come to an end without executing any change of the bundling type.

On the other hand, if the bundling type is the type 1 (step S702: TYPE 1), the TTI bundling HARQ control unit 332 changes the bundling type from the type 2 to the type 1 (step S703) and causes the change process to come to an end. Thus, thereafter, the bundling type of data transmitted from the mobile station 300 to the base station 200 is the bundling type represented by the type 1 (the data A of FIG. 1).

Figure 8A:
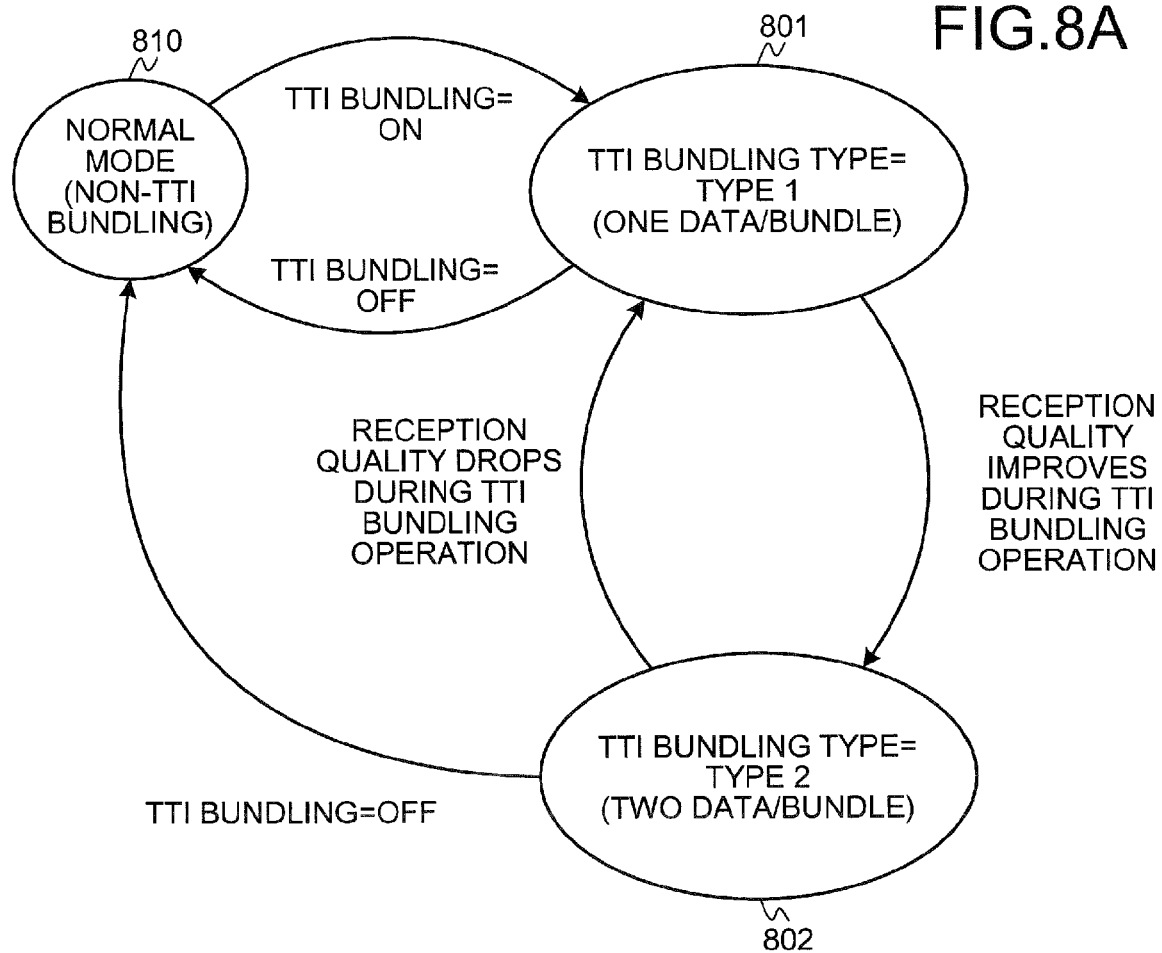
FIG. 8A is a diagram of state transitions of the base station.

FIG. 8A is a diagram of state transitions of the base station and depicts the states of mutual transitions between the non-TTI bundling (referred to as "normal mode"), and the types (the type 1 and type 2) of the TTI bundling. The uplink signal control function unit 221 of the base station 200 instructs switching for these state transitions. In the initial state, the base station 200 operates with the TTI bundling type that is the type 1 (a state 801).

Thereafter, when the reception quality improves for receiving the data from the mobile station 300, the TTI bundling HARQ control unit 225 of the base station 200 changes the TTI bundling type to the type 2 (a state 802). In a case where the TTI bundling type is the type 2, when the reception quality drops for receiving the data from the mobile station 300, the base station 200 sets back the TTI bundling type to be the type (the state 801).

Although it is assumed that the TTI bundling operation is executed (TTI bundling=ON) in the embodiment, the base station 200 can also switch the state thereof to the non-TTI bundling state (the TTI bundling=OFF) (a state 810).

The state can be switched from the TTI bundling states (the type 1 of the state 801 and the type 2 of the state 802) to the non-TTI bundling (referred to as "normal mode") state 810 by setting the TTI bundling to be TTI bundling=OFF as depicted in all cases.

On the other hand, for the switching of the state from the non-TTI bundling (referred to as "normal mode") state 810 to the TTI bundling (TTI bundling=ON) state, the state is adapted to always transition to the type 1 of the state 801. This is because the type 1 of the TTI bundling corresponds to the current standard of the 3GPP. For the state transition to the TTI bundling state, the state is adapted to transition to the type 1 and thereafter, to the type 2.

Figure 8B:
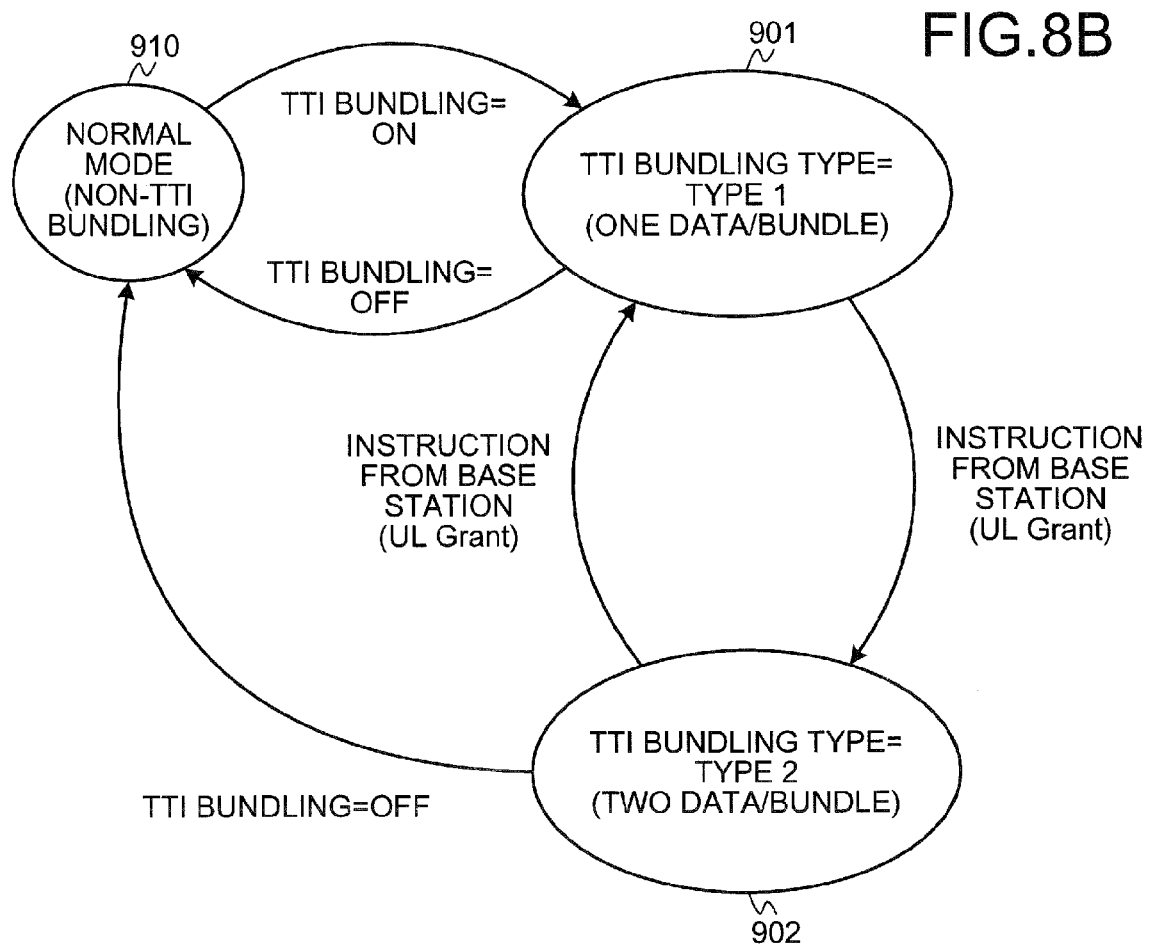
FIG. 8B is a diagram of state transitions of the mobile station.

FIG. 8B is a diagram of state transitions of the mobile station. The state transitions of the mobile station 300 are similar to those of the base station 200 and based on the information on the TTI bundling ON or OFF state and the TTI bundling type=type 1/type 2) included in the control signal from the base station 200, the switching is executed according to this information. For the state transitions, the control signal processing unit 322 of the mobile station 300 instructs to switch based on the reception of the control signal from the base station 200. The mobile station 300 operates with the TTI bundling type that is the type 1 in the initial state (a state 901). In the type 1, as indicated by the data A of FIG. 1, only one new data is included in one transmission session.

Thereafter, if the base station 200 determines that the reception quality has improved for the reception of the data from the mobile station 300, the TTI bundling HARQ control unit 225 of the base station 200 changes the TTI bundling type to the type 2, includes the information thereon in the control signal, and transmits the information to the mobile station 300. In response, the mobile station 300 changes the TTI bundling type to the type 2 (a state 902). In the type 2, as indicated by the data B of FIG. 1, two new data are included in one transmission session.

In a case where the TTI bundling type is the type 2, if the base station 200 determines that the reception quality has dropped for the reception of the data from the mobile station 300, the TTI bundling HARQ control unit 225 of the base station 200 changes the TTI bundling type to the type 1, includes in the control signal, information concerning the change, and transmits the information to the mobile station 300. In response, the mobile station 300 sets back the TTI bundling type to be the type 1 (the state 901).

The state can be switched from the TTI bundling state (the type 1 of the state 901 and the type 2 of the state 902) to the non-TTI bundling (referred to as "normal mode) state 910 by setting the TTI bundling to be TTI bundling=OFF as depicted in all cases.

On the other hand, for the switching of the state from the non-TTI bundling (referred to as "normal mode") state 910 to the TTI bundling (the TTI bundling=ON) state, the state is adapted to always transition to the type 1 of the state 901. This is because the type 1 of the TTI bundling corresponds to the current standard of the 3GPP. For the state transition to the TTI bundling, the state is adapted to transition to the type 1 and thereafter, to the type 2. An existing RACH procedure is necessary when the TTI bundling itself is turned ON or OFF and thereby, the state is caused to transition between the TTI bundling scheme and the non-TTI bundling HARQ scheme.

FIG. 9 is a sequence diagram of communication on the bundling type change between the base station and the mobile station. The base station 300 normally receives a grant signal (control CH: PDCCH) giving notification of information concerning resource allocation, from the base station 200; includes data in the allocated resource; and transmits the resource. In the embodiment, the base station 200 gives notification by including information concerning the bundling type (the type 1 or the type 2) in the grant signal (steps S901, S903, and S910).

The mobile station 300 sees the bundling type information in the grant signal and changes the bundling type of the data to be transmitted to the type 1 or the type 2 (steps S902, S904, and S911). The base station 200, which has received the data, processes the data received from the mobile station 300, using the bundling type notified in the grant signal.

The grant signal is used in the normal sequence and enables the bundling type to be dynamically changed maintaining the TTI bundling state. When the bundling type is the type 2, taking into consideration the mobile station 300 that does not yet support the bundling function of the type 2, preferably, the TTI bundling type information is included in the region of the grant signal that does not influence the mobile station 300 not yet supporting the function. A TTI bundling type information region is disposed taking into consideration a non-reference region (a don't-care region) of the mobile station 300 not yet supporting the function and thus, the mobile station 300 not yet supporting the type 2 does not refer to the don't-care region and therefore, is not affected by the information.

The mobile station 300 not yet supporting the type 2 does not recognize the information on the type 2 from the base station 200 even when the information comes thereto, and executes the conventional TTI bundling operation (the bundling type=the type 1). The base station 200 decodes the bundled data using information on a redundancy version (RV) index, etc., based on parameters notified by the grant signal and thus, can recognize that the bundling type 1 is maintained, and can determine the mobile station 300 is a mobile station 300 that does not yet support the type 2. When the mobile station 300 supports the type 2 and the base station 200 does not yet support the type 2, the TTI bundling type information itself is not included in the grant signal and therefore, the mobile station 300 and the base station 200 operate in the conventional TTI bundling operation (the bundling type 1).

Figure 10A:
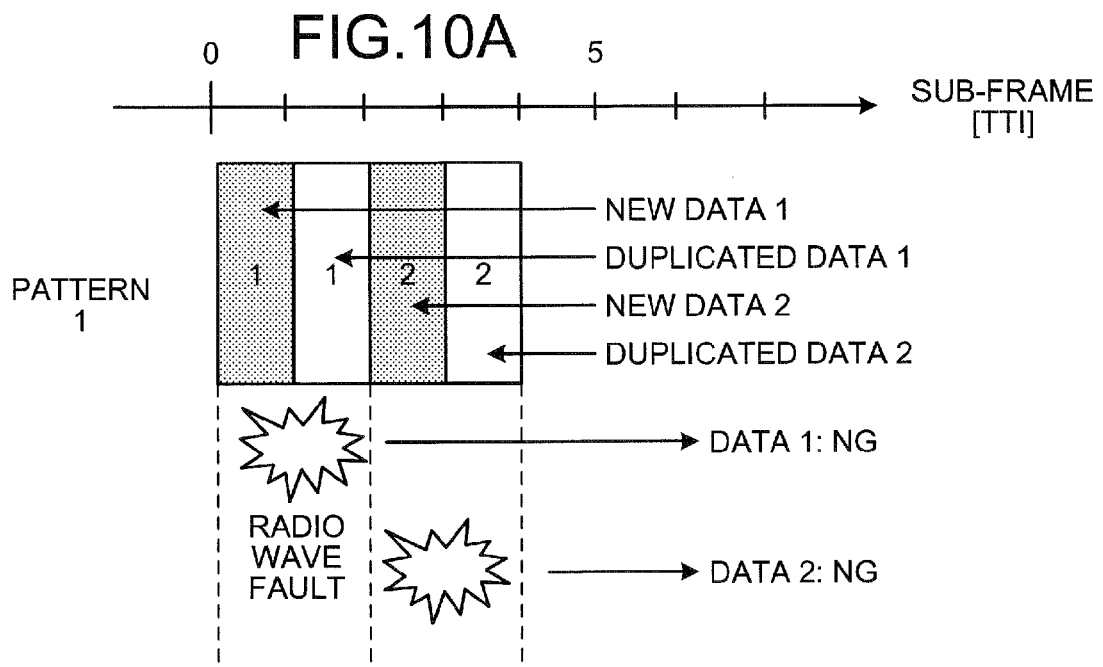
Figure 10B:
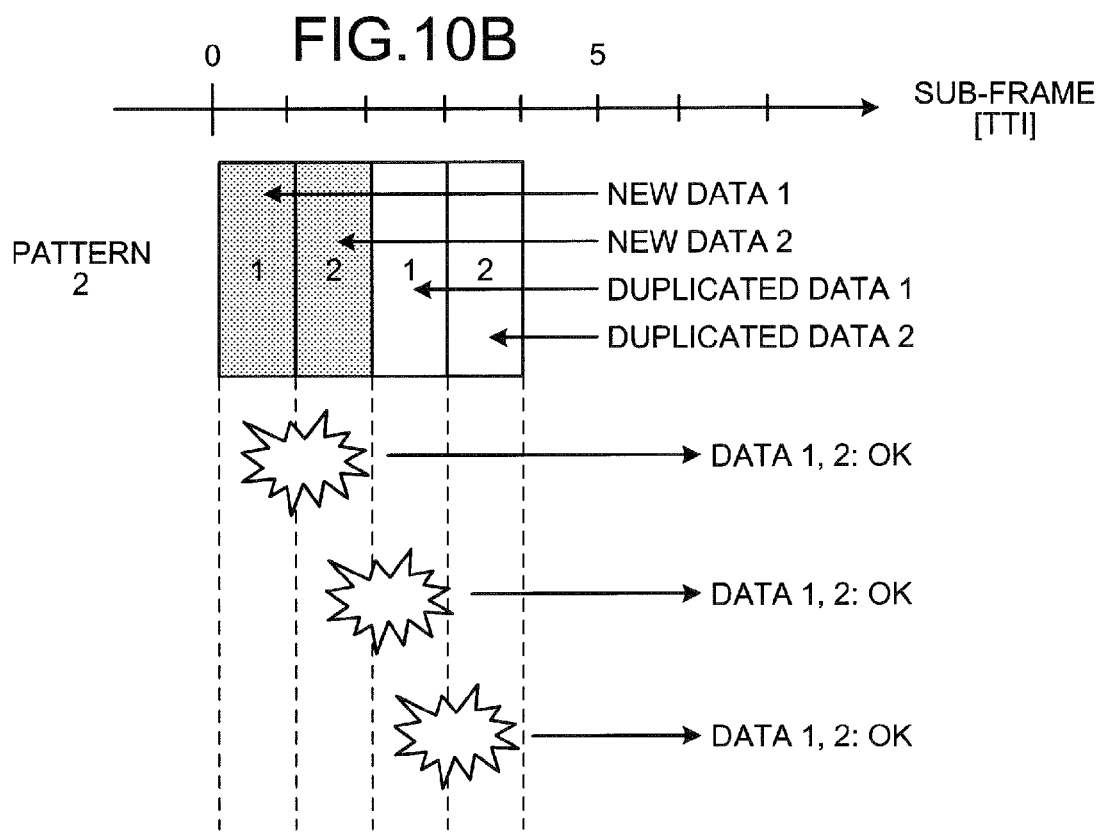

FIGS. 10A to 10C are each a diagram of data resource allocation when the bundling type is the type 2. When the bundling type is the type 2, the depicted three patterns can be considered as methods of disposing the new data×2 and the duplicated data×2 in four TTIs in one transmission session. Pattern information indicating the position of the new data is included in the grant signal notified by the base station 200 to the mobile station 300. Thus, the mobile station 300 can dispose the data in the pattern notified of and can transmit the data.

The new data 1, the duplicated data 1, the new data 2, and the duplicated data 2 are disposed in this order in a pattern 1 depicted in FIG. 10A. The pattern 1 corresponds to the data B depicted in FIG. 1. The new data 1, the new data 2, the duplicated data 1, and the duplicated data 2 are disposed in this order in a pattern 2 depicted in FIG. 10B. The new data 1, the new data 2, the duplicated data 2, and the duplicated data 1 are disposed in this order in a pattern 3 depicted in FIG. 10C.

It is assumed that, for the patterns 1 to 3, a radio wave fault occurs to be a factor degrading the reception quality (CRC-NG) of any one of the data and keeps occurring for a time period of two TTIs.

In the pattern 1, the new data and the duplicated data are consecutively placed in two TTIs and therefore, as depicted, when the radio wave fault occurs for two TTIs, both the new and the duplicated data 1 (or data 2) tend to be NG (not good).

In the pattern 2, the new data 1 and 2 are consecutively placed in two TTIs and the duplicated data 1 is placed next to the new data 2 and therefore, even when the radio wave fault occurs during any time period of two TTIs, either the new or the duplicated data is OK and therefore, robustness is high.

In the pattern 3, the new data 2 and the duplicated data 2 are consecutively placed in two TTIs and therefore, as depicted, when a radio wave fault occurs in this time period, the data 2 is NG. During a time period other than this, the robustness of the pattern 3 is higher than that of the pattern 1. As a result, the robustness against the degradation of the reception quality caused by the radio wave fault, etc., is degraded in order of the pattern 2, the pattern 3, and the pattern 1. The pattern 2 achieving a temporal interleaving effect has the highest robustness.

Figure 11:
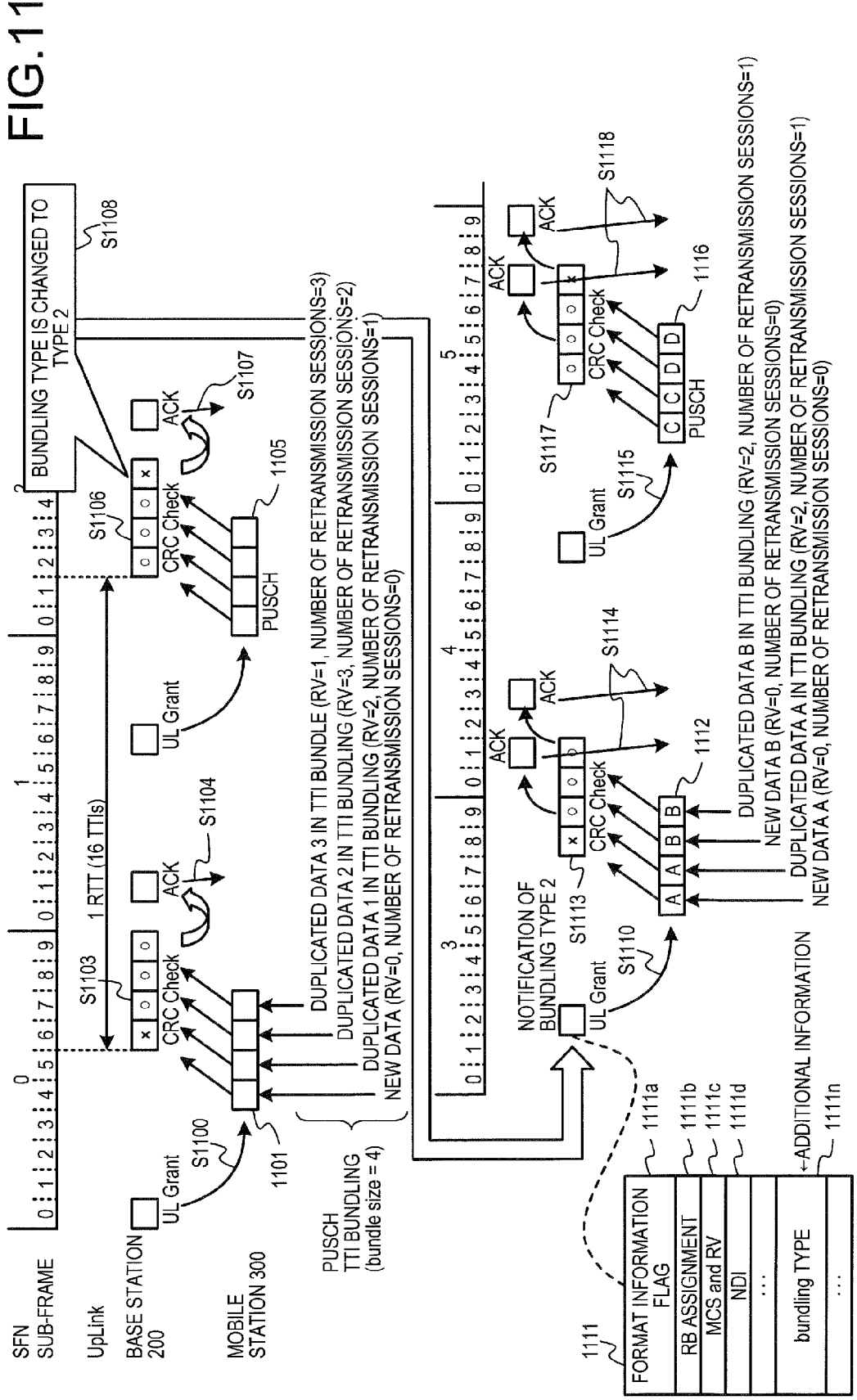
FIG. 11 is a time chart for explaining a change of the bundling type based on the reception quality.

Details of the data content based on the TTI bundling will be described that is described in the embodiment. FIG. 11 is a time chart for explaining the change of the bundling type based on the reception quality. The axis of abscissa represents the sub-frame (time). The base station 200 transmits the grant signal to the mobile station 300 (step S1100) and notifies the mobile station 300 of the type of the TTI bundling. In this case, in the initial state, the type 1 is notified. Thereby, the mobile station 300 transmits to the base station 200, data 1101 TTI-bundled in the type 1. As above, the bundle size of this bundling is four and the new data×1 and the duplicated data×3 are included in four TTIs.

The base station 200 receives the data 1101 from the mobile station 300 and, as a result, a CRC-NG is acquired for the new data while a CRC-OK is acquired for each of the other duplication data×3 (step S1103). Because one or more CRC-OK(s) is/are present, the base station 200 notifies the mobile station 300 of the ACK (step S1104).

In the same procedure as above, the mobile station 300 transmits a second-time data 1105 to the base station 200. As depicted, a cycle necessary for the one transmission and reception session (1 RTT) is 16 TTIs. One or more CRC-OK(s) is/are also acquired for the data 1105 (step S1106) and therefore, the base station 200 notifies the mobile station 300 of the ACK (step S1107). The base station 200 changes the bundling type to the type 2 consequent to the reception quality of the data from the mobile station 300 being favorable for a specific time period (step S1108). The above process necessary for the change of the bundling type executed by the base station 200 is depicted in FIG. 4.

The base station 200 includes information concerning the changed bundling type=the type 2 in the grant signal and notifies the mobile station 300 of the information (step S1110). In the grant signal 1111, regions are disposed such as a format information flag 1111*a*, an RB assignment 1111*b*, an MCS and RV 1111*c*, an NDI 1111*d*, and a bundling type 1111*n*. The format information flag 1111*a* is a format identification flag for the control information. The RB assignment 1111*b* is assignment information of the resource block. The modulation and coding scheme and redundancy version (MCS and RV) 1111*c* is duplication version information on the modulation, the coding, the initial transmission, and retransmission. The new data indicator (NDI) 1111*d* is a parameter indicating the new data. The bundling type 1111*n* is not referred to by a mobile station 300 that does not yet support the type 2, by newly providing a region and securing the bundling type 1111*n* in the don't-care region as described above.

The mobile station 300 changes the bundling type to the type 2 in response to the information concerning the type 2 included in the grant signal from the base station 200. The process for the changing of the bundling type executed by the mobile station 300 is depicted in FIG. 5. In the example depicted in FIG. 11, data 1112 is transmitted to the base station 200 in an arrangement based on the pattern 1 (see FIG. 10A). The mobile station 300 transmits the two data A and B in the type 2. In this case, based on the bundling in the pattern 1, the data A and B are disposed in order of the new data A, the duplicated data A, the new data B, and the duplicated data B.

The base station 200 receives the data 1112 from the mobile station 300 and, as a result, acquires the new data A with a CRC-NG and each of the other data×3 with a CRC-OK (step S1113). As a result, one or more CRC-OK(s) is/are acquired and therefore, the base station 200 notifies the mobile station 300 of the ACK (step S1114). As depicted, for the data A, the ACK is transmitted when either of the new data A and the duplicated data A is acquired with the OK. For the data B, the ACK is also transmitted when either of the new data B and the duplicated data B is acquired with the OK (in the example depicted, each thereof is acquired with the OK).

If the reception quality of the data received in the type 2 does not drop during a predetermined time period, the base station 200 determines that the bundling in the type 2 may be maintained. In this case, at step S1115, of the grant signal to be transmitted to the mobile station 300, the information in the region of the bundling type is not rewritten and still indicates the type 2 as in the previous session.

Thereby, the mobile station 300 determines that both the data A and B can be received normally by the base station 200 based on the reception of the ACK, and transmits new data C and D in the next session. In this case, the arrangement of data 1116 based on the bundling in the pattern 1 is set to be in order of new data C, duplicated data C, new data D, and duplicated data D.

The base station 200 receives the data 1116 from the mobile station 300 and as a result, acquires the duplicated data D with a CRC-NG and each of the other data×3 with a CRC-OK (step S1117). As a result, one or more CRC-OK(s) is/are acquired and therefore, the base station 200 notifies the mobile station 300 of the ACK (step S1118).

As above, when the reception quality is favorable of not only the transmission of one of data but also the data received by the base station in a one data transmission session from the mobile station 300 to the base station 200, the bundling type is changed for two data different from one another to be transmitted in one data transmission session (four TTIs). Thereby, when the reception quality of the data from the mobile station is favorable, the base station can receive more data from the mobile station and the throughput of the uplink transmission path from the mobile station 300 to the base station 200 can be improved.

Figure 12:
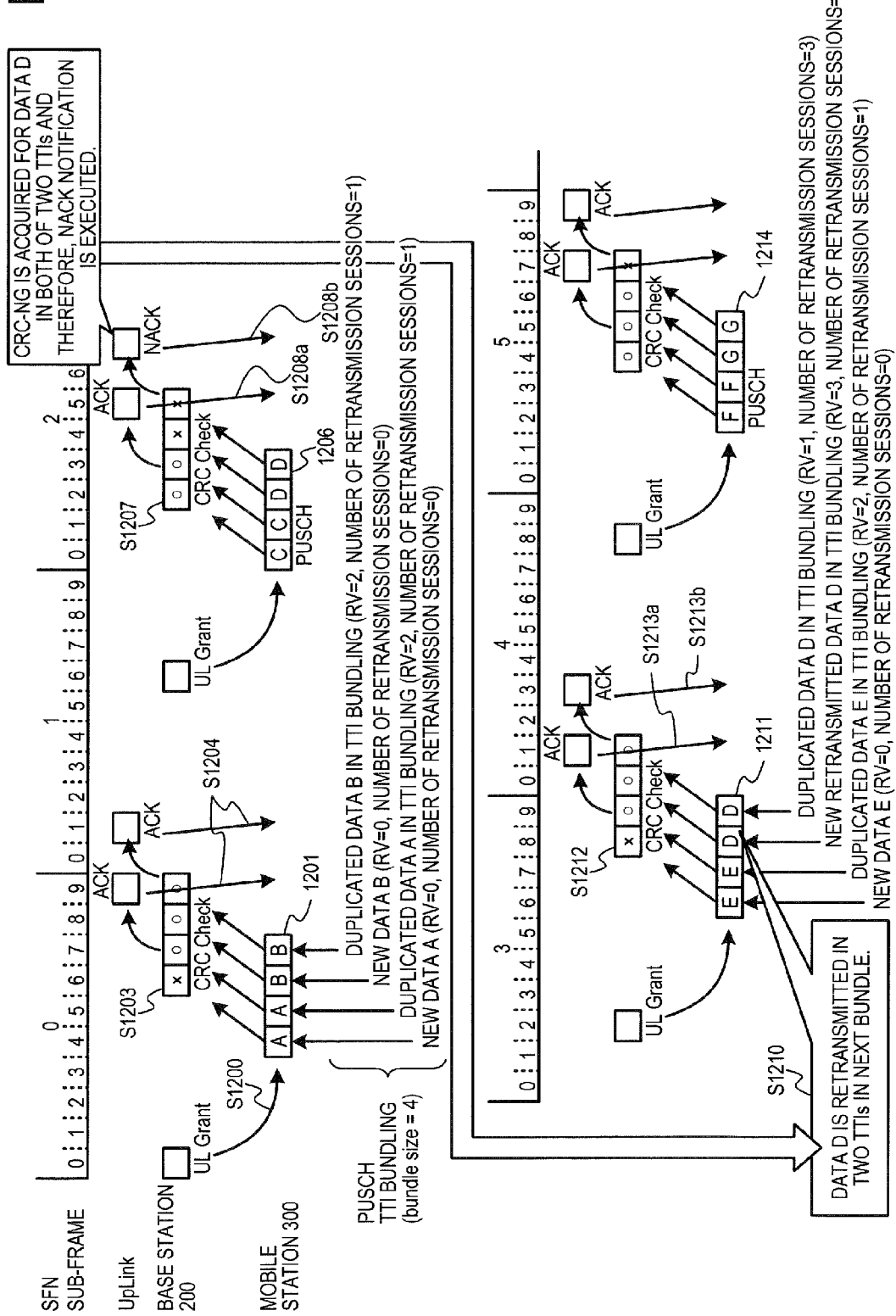
FIG. 12 is a time chart for explaining retransmission control executed when the bundling type is the type 2.

FIG. 12 is a time chart for explaining the retransmission control executed when the bundling type is the type 2. The retransmission control of data in the type 2 will be described. The base station 200 includes the information on the bundling type=the type 2 in the grant signal and notifies the mobile station 300 of the information (step S1200).

The mobile station 300 transmits the two data A and B as data 1201 in response to the information concerning the type 2 included in the grant signal from the base station 200. In this case, based on the bundling in the pattern 1, the data A and B are disposed in order of the new data A, the duplicated data A, the new data B, and the duplicated data B.

The base station 200 receives the data 1201 from the mobile station 300 and as a result, acquires the new data A with a CRC-NG and each of the other data×3 with a CRC-OK (step S1203). As a result, one or more CRC-OK(s) is/are acquired and therefore, the base station 200 notifies the mobile station 300 of the ACK (step S1204).

Thereby, the mobile station 300 determines based on the reception of the ACK, that both the data A and B can be received normally by the base station 200, and transmits the new data C and D in the next session. In this case, the arrangement of data 1206 based on the bundling in the pattern 1 is set to be in order of the new data C, the duplicated data C, the new data D, and the duplicated data D.

The base station 200 receives the data 1206 from the mobile station 300; as a result, for the data C, acquires CRC-OKs for both of the new data C and the duplicated data C (step S1207); and notifies the mobile station 300 of the ACK (step S1208*a*). However, for the two TTIs of the data D, CRC-NGs are acquired for both the new data D and the duplicated data D (step S1207). Therefore, the base station 200 notifies the mobile station 300 of the NACK for the data D (step S1208*b*).

Thus, the mobile station 300 determines based on the reception of the NACK for the data D, that the data D cannot be received normally by the base station 200, and also determines that the data D is to be transmitted again in the next transmission session (step S1210). Therefore, the mobile station 300 sets new data E and the data D to be retransmitted to be data 1211. The data D to be retransmitted is disposed in the portion of two TTIs in the post stage of two TTIs used by the new data E.

The base station 200 receives the data 1211 from the mobile station 300 and as a result, for the retransmitted data D, CRC-OKs are acquired for both the new data D and the retransmitted data D (step S1212). The base station 200 notifies the mobile station 300 of the ACK (step S1213*b*). For the data E, the new data E is acquired with a CRC-NG while the new data E is acquired with a CRC-OK (step S1212) and therefore, the base station 200 notifies the mobile station 300 of the ACK (step S1213*a*).

The data D can be retransmitted according to the above process. Thereafter, the mobile station 300 transmits data F and data G as new data 1214 to the base station 200. The number of retransmission sessions of the data D can be regulated based on the change threshold value N. For example, assuming that the change threshold value N depicted in FIG. 6 is four, the bundling type is changed from the type 2 to the type 1 when the number of retransmission sessions of the data D exceeds four and therefore, the number of retransmission sessions can be reduced compared to that for the type 2.

As described, even when the bundling type is the type 2, the data can be retransmitted maintaining the type 2; one data can be retransmitted using the two TTIs of the four TTIs for one transmission session; and in this case, new data can also be transmitted. Therefore, in the type 2, even when retransmission occurs, more data can be transmitted compared to the type 1 and the throughput can be improved of the uplink transmission path from the mobile station 300 to the base station 200.

In the disclosed technique, the configuration employing the one mobile station 300 has been described. However, the base station 200 accommodates plural mobile stations 300 and can change the TTI bundling type for each of the plural mobile stations 300. The base station 200 manages the reception quality of each of the mobile stations 300 and thereby, can independently change the TTI bundling type of each of the mobile stations 300; and consequently, can execute dynamic transmission control of the data on the TTI bundling corresponding to the state of each of the mobile stations 300. Thus, the resources can be used efficiently, the uplink data speed can be improved, and the latency can be reduced. The effective use of the resources can prevent the mobile station 300 from wastefully transmitting data and therefore, electric power saving of the mobile station 300 can be facilitated.

In the embodiment, the configuration to execute the TTI bundling control using the uplink has been described. However, the system configuration is applicable to the TTI bundling control using the downlink. In this case, the mobile station monitors the data reception state based on the TTI bundling transmitted from the apparatus of the base station. The notification information concerning the change of the bundling type (the type 1 or the type 2) from the mobile station to the apparatus of the base station is included in an uplink control signal from the mobile station to the apparatus of the base station.

The mobile station monitors the data reception quality of the TTI bundling transmitted from the base station and executes the resource control of data to be transmitted to the mobile station. Thereby, in the type 2, for the downlink from the apparatus of the base station to the mobile station, the probability of reception by the mobile station can be increased maintaining the TTI bundling operation, that is, maintaining the combinations including the new data and the duplicated data per combination and concurrently, about twice as much data can be transmitted. Thus, efficient data transmission is enabled.

The system may be of another configuration in which the base station transmits no notification information concerning the change of the bundling type and the mobile station changes by itself the bundling type, to execute the TTI bundling control using the uplink. For example, the mobile station measures the uplink communication speed and if the communication state is favorable, changes by itself the bundling type to the type 2. Otherwise, the mobile station changes by itself the bundling type to the type 2 when the communication state is favorable based on the reception state of the data from the base station. Such a configuration is applicable to the downlink TTI bundling control, that is, a configuration in which the mobile station transmits no notification information concerning a change of the bundling type and the base station changes by itself the bundling type.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station configured to communicate with a mobile station consecutively transmitting n packets for one session, where n>1, the base station comprising:
    a measuring circuit configured to use a predetermined threshold value to determine reception quality of the n consecutive packets received from the mobile station; and
    a control circuit responsive to a result of the measurement by the measuring circuit, configured to execute control to output any one among first notification information to cause the mobile station to transmit one new packet and (n−1) duplicated packets thereof for the one session and second notification information to cause the mobile station to transmit m new packets that are different from one another and (n−m) duplicated packets thereof for the one session, where n>m>1.

2. The base station according to claim 1, wherein
    the measuring circuit is configured to determine, based on the output of the second notification information and for the one session, the reception quality of the m new packets and the (n−m) duplicated packets, respectively received from the mobile station.

3. The base station according to claim 1, wherein
    the measuring circuit is configured to determine the reception quality of the n packets based on results of a plurality of measurements on packets received in the one session.

4. The base station according to claim 1, wherein
    the control circuit is configured to designate, in the second notification information, an arrangement pattern of the m new packets and the (n−m) duplicated packets, the arrangement pattern being for the one session.

5. The base station according to claim 1, wherein
    the control circuit is configured to notify the mobile station of the first notification information and the second notification information using a notification information region that is in a control signal used in transmission and reception of communication control with the mobile station and that does not affect a mobile station having no function of receiving m new packets that are different from one another for the one session.

6. The base station according to claim 1, wherein
    the measuring circuit is configured to determine the reception quality based on a result of error detection of the n packets.

7. A mobile station comprising:
    a transmitting circuit configured to consecutively transmit to a base station n packets for one session, where n>1;
    a receiving circuit configured to receive notification information determined by the base station based on reception quality of the n packets transmitted from the transmitting circuit; and
    a control circuit configured to execute control, in accordance with the notification information received by the receiving circuit, to transmit one new packet and (n−1) duplicated packets thereof for one session, when the notification information received by the receiving circuit is first notification information, and to transmit m new packets that are different from one another and (n−m) duplicated packets thereof, when the notification information received by the receiving circuit is second notification information, where n>m>1.

8. The mobile station according to claim 7, wherein
    the control circuit is configured to cause the m new packets and the (n−m) duplicated packets to be transmitted according to an arrangement pattern for the one session designated in the notification information from the base station.

9. The mobile station according to claim 7, wherein
    the control circuit is configured to acquire the notification information from the base station by referring to information set in a notification information region that is in a control signal used in transmission and reception of communication control with the base station and that does not affect a mobile station having no function of receiving the m new packets.

10. The mobile station one according to claim 7, wherein
    the control circuit is configured to retransmit the m new packets and the (n−m) duplicated packets a next transmission session, when the notification information from the base station indicates a request for retransmission of data during a time period of the control to cause the m new packets and (n−m) duplicated packets to be transmitted for the one session.

11. A communication system comprising a mobile station configured for consecutively transmitting n packets, where n>1, for one session,
    wherein the base station, which is configured to control transmission of the packets by the mobile station, comprises:
        a measuring circuit configured to use a predetermined threshold value to determine reception quality of the n consecutive packets received from the mobile station; and a control circuit configured to execute, in response to a result of the measurement by the measurement circuit, control to output one of first notification information to cause the mobile station to transmit one new packet and (n−1) duplicated packets thereof for the one session and second notification information to cause the mobile station to transmit m packets that are different from one another and (n−m) packets thereof for the one session, where n>m>1; and wherein the mobile station comprises:
   a transmitting circuit configured to transmit the n packets consecutively to the base station;
   a receiving circuit configured to receive the notification information from the base station; and
   a control circuit configured to execute control, in accordance with the notification information received by the receiving circuit, to transmit the one new packet and (n−1) duplicated packets thereof for the one session, when the receiving circuit receives the first notification information, and to transmit the m packets that are different from one another and (n−m) packets thereof for the one session, when the receiving circuit receives the second notification information.

* * * * *